(12) United States Patent
Sellers

(10) Patent No.: US 11,595,440 B2
(45) Date of Patent: Feb. 28, 2023

(54) MAINTAINING INTERACTIVE SESSION CONTINUITY IN HONEYPOT DEPLOYMENTS

(71) Applicant: Rapid7, Inc., Boston, MA (US)

(72) Inventor: Thomas Eugene Sellers, Georgetown, TX (US)

(73) Assignee: Rapid7, Inc., Boston, MA (US)

( * ) Notice: Subject to any disclaimer, the term of this patent is extended or adjusted under 35 U.S.C. 154(b) by 121 days.

(21) Appl. No.: 17/224,348

(22) Filed: Apr. 7, 2021

(65) Prior Publication Data

US 2021/0226993 A1    Jul. 22, 2021

Related U.S. Application Data

(63) Continuation of application No. 16/367,502, filed on Mar. 28, 2019, now Pat. No. 11,038,919.

(51) Int. Cl.
*H04L 29/06*    (2006.01)
*H04L 9/40*    (2022.01)
*H04L 61/5007*    (2022.01)

(52) U.S. Cl.
CPC ...... *H04L 63/1491* (2013.01); *H04L 61/5007* (2022.05); *H04L 63/1416* (2013.01)

(58) Field of Classification Search
None
See application file for complete search history.

(56) References Cited

U.S. PATENT DOCUMENTS

| | | | |
|---|---|---|---|
| 9,602,536 B1* | 3/2017 | Brown, Jr. | ............ H04L 63/083 |
| 2004/0128529 A1 | 7/2004 | Blake et al. | |
| 2004/0128543 A1 | 7/2004 | Blake et al. | |
| 2005/0166072 A1 | 7/2005 | Converse et al. | |
| 2008/0018927 A1 | 1/2008 | Martin et al. | |
| 2008/0271151 A1 | 10/2008 | Blake et al. | |
| 2009/0328213 A1 | 12/2009 | Blake et al. | |
| 2015/0058983 A1 | 2/2015 | Zeitlin et al. | |
| 2015/0128246 A1* | 5/2015 | Feghali | ............... H04L 63/0209 726/13 |
| 2017/0310705 A1 | 10/2017 | Gopalakrishna et al. | |
| 2018/0198822 A1* | 7/2018 | Brown, Jr. | .......... H04L 63/1491 |
| 2018/0262529 A1* | 9/2018 | Allen | .................... G06F 21/566 |
| 2018/0375897 A1 | 12/2018 | Kawasaki et al. | |
| 2019/0058733 A1* | 2/2019 | Wright | ................ H04L 63/1425 |
| 2019/0238589 A1* | 8/2019 | Stutz | ................... H04L 63/1416 |
| 2021/0226993 A1* | 7/2021 | Sellers | ................ H04L 63/1491 |

* cited by examiner

*Primary Examiner* — Jeffery L Williams
(74) *Attorney, Agent, or Firm* — Ashwin Anand

(57) ABSTRACT

Disclosed herein are methods, systems, and processes for provisioning and deploying deception computing systems with dynamic and flexible personalities. A network connection is received from a source Internet Protocol (IP) address at a honeypot. In response to receiving the network connection, a personality state table is accessed and a determination is made as to whether a personality that corresponds to the source IP address exists in the personality state table. If the personality exists, the personality is designated to the source IP address. If the personality does not exist, an attack characteristic of the network connection is determined and an alternate personality that is substantially similar to the attack characteristic is designated to the source IP address.

20 Claims, 14 Drawing Sheets

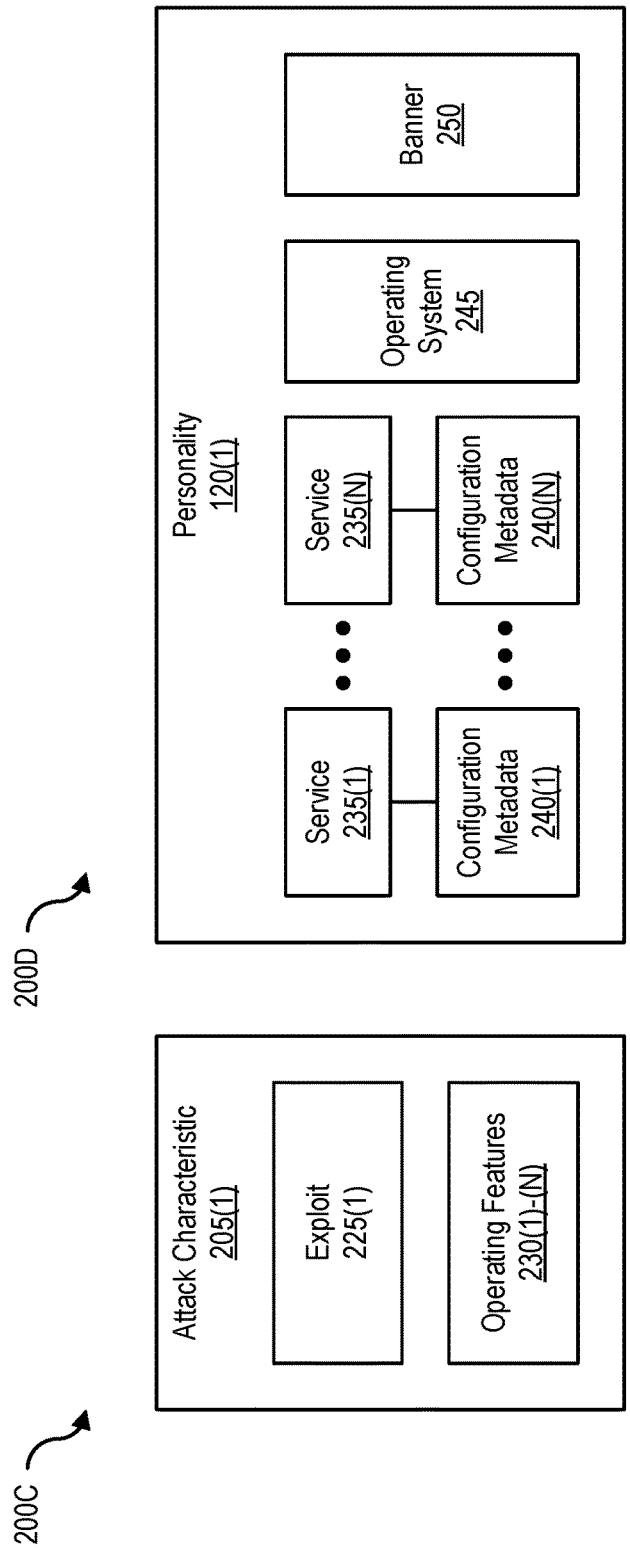
FIG. 2C
FIG. 2D
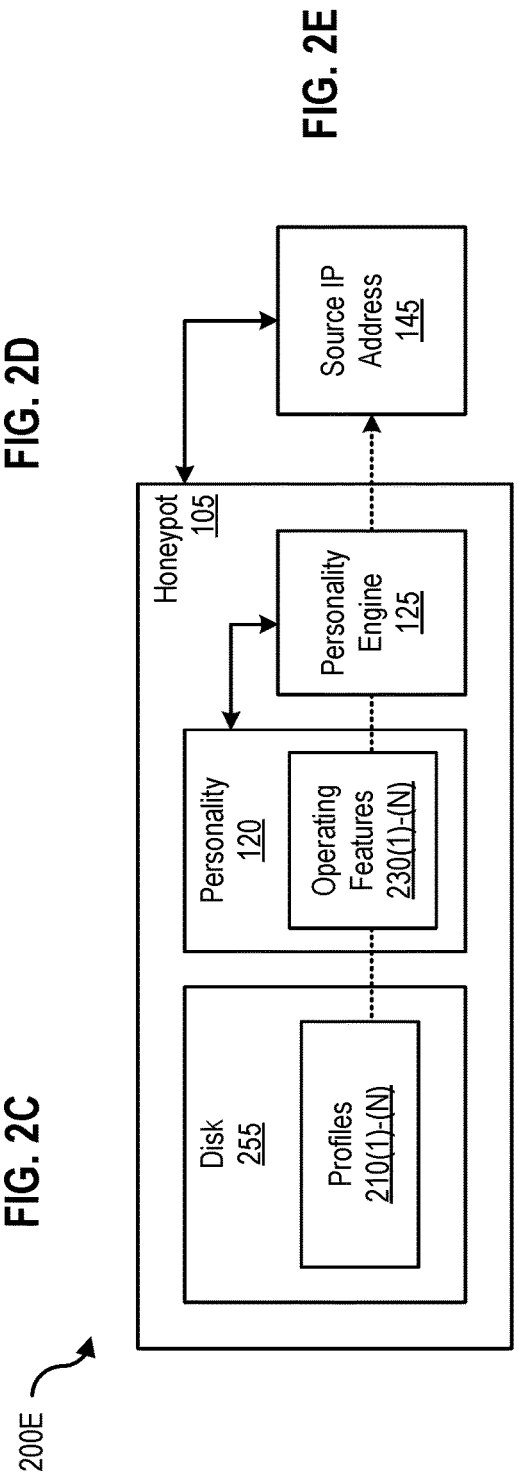
FIG. 2E

| Personality State Table 305 | | | | | |
|---|---|---|---|---|---|
| Network Connection Field 310 | Source IP Address Field 315 | Exploit or Vulnerability Field 320 | Personality Trait(s) Field 325 | Personality Required Field 330 | Personality Availability Field 335 | Action Required Field 340 |
| 345(1) | 69.89.31.226 | EternalBlue | SMB; Windows | 120(1) | Yes | Designate |
| 345(2) | 172.16.254.1 | Cloudbleed | Cloudflare proxy | 120(2) | Yes | Designate |
| 345(3) | 216.58.216.164 | Apache Struts | Java | 120(3) | No | Create |
| 345(4) | 221.138.62.1 | Winbox RCE | MikroTik RouterOS | 120(4) | Yes | Designate |
| 345(5) | 134.23.45.123 | Jboss jmx-console probe | Jboss Application Server | 120(5) | No | Create |
| 345(6) | 245.192.1.123 | MySQL authentication | MySQL Server | 120(6) | Yes | Designate |
| ... | ... | ... | ... | ... | ... | ... |

MAINTAINING INTERACTIVE SESSION CONTINUITY IN HONEYPOT DEPLOYMENTS

CROSS-REFERENCE TO RELATED APPLICATIONS

The present application claims the benefit of priority and is a continuation of pending U.S. patent application Ser. No. 16/367,502 titled "Multiple Personality Deception Systems" and filed on Mar. 28, 2019, the disclosure of which is incorporated by reference as if set forth in its entirety herein.

BACKGROUND

Field of the Disclosure

This disclosure is related to deception systems implemented in cybersecurity computing environments. In particular, this disclosure is related to provisioning and deploying deception systems with dynamic and flexible personalities.

Description of the Related Art

Honeypots are physical or virtual computing systems implemented in a network as a decoy to lure malicious actors (e.g., hackers) in an attempt to detect, deflect, and/or study hacking attempts. Such deception systems can be configured as an enticing target for attackers (e.g., as a high-value server) and can be used to gather valuable attack telemetry data (e.g., identity of attackers, attack mechanism(s) used, targets sought, and the like). Therefore, honeypots are implemented in modern cybersecurity computing environments to identify and defend (against) attacks from advanced persistent threat actors.

Unfortunately, a honeypot with a narrowly defined personality will not entice attackers looking for a specific type of target and a honeypot with a broadly defined personality that is vulnerable to a vast range of exploits will stand out as an obvious honeypot. Therefore, it is desirable to align a honeypot's personality with an attacker's desired target.

SUMMARY OF THE DISCLOSURE

Disclosed herein are methods, systems, and processes for provisioning and deploying deception systems with dynamic and flexible personalities. One such method involves receiving a first network connection received from a first source Internet Protocol (IP) address at a honeypot. In response to receiving the first network connection, the method involves accessing a personality state table and determining whether a first personality that corresponds to the first source IP address exists in the personality state table. If the personality exists, the method designates the first personality to the first source IP address. However, if the personality does not exist, the method determines an attack characteristic of the first incoming network connection and designates an alternate personality in the personality state table that is substantially similar to the attack characteristic.

In one embodiment, the first network connection includes a first incoming malicious attack that is generated by an attacker and intended for a first production host. In another embodiment, the method involves generating the alternate personality if the alternate personality does not exist and modifying the personality state table to include the alternate personality.

In some embodiments, the method involves receiving a second network connection received from a second source IP address at the honeypot, accessing the personality state table, determining that a second personality that corresponds to the second source IP address exists in the personality state table, and designating the second personality to the second source IP address in response to receiving the second network connection. In other embodiments, the attack characteristic identifies one or more operating features of the first production host expected or sought by one or more exploits associated with the first incoming malicious attack.

In one embodiment, designating the first personality to the first source IP address includes exclusively presenting the first personality to the attacker for a first duration of time. In another embodiment, the method involves determining that the first personality and the alternate personality are not substantially similar to the attack characteristic, generating a live personality based on the one or more operating profiles, and modifying the personality state table by adding the live personality to the personality state table and designating the live personality to the first source IP address for the first duration of time.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings and/or figures.

FIG. 2C is a block diagram 200C of an attack characteristic, according to one embodiment of the present disclosure.

FIG. 2D is a block diagram 200D of a personality, according to one embodiment of the present disclosure.

FIG. 2E is a block diagram 200E of a honeypot, according to one embodiment of the present disclosure.

FIG. 3 is a table 300 that illustrates a personality state table, according to one embodiment of the present disclosure.

Figure 1A:
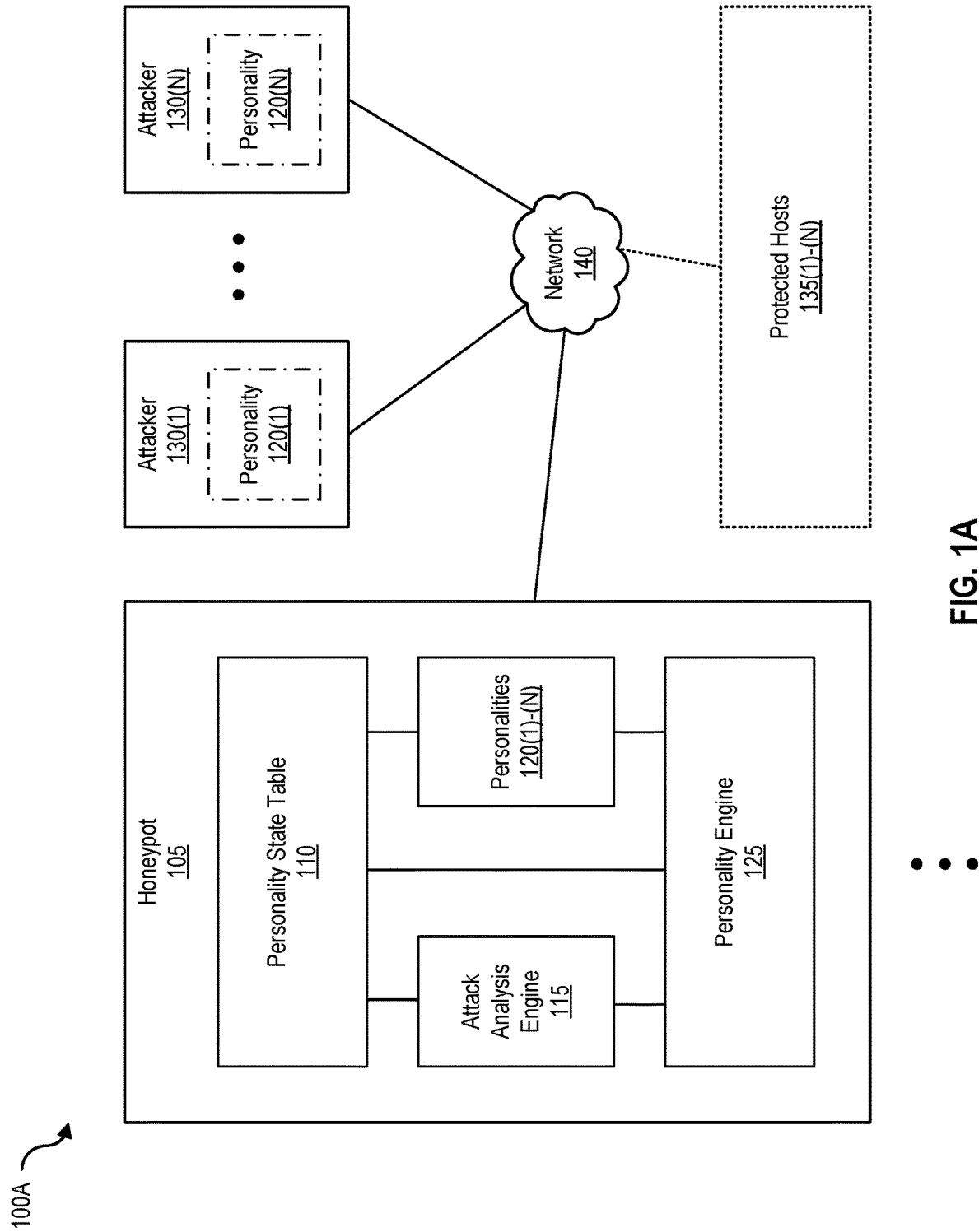
FIG. 1A is a block diagram 100A of a honeypot that implements a personality state table (PST), according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

INTRODUCTION

The primary value of configuring, provisioning, implementing, deploying, and maintaining honeypots that are presented to malicious attackers in cybersecurity computing environments depends largely on preserving, for as long as possible, their decoy identity as a real production system that is a protected host. This decoy identity is based on a personality that is assigned to a honeypot to enable the honeypot to function as a deception computing system. Each personality can include one or more personality traits that mimic a protected host (e.g., an Operating System (OS), storage connectivity and/or network connectivity and associated protocols used/required, type of data contained, and the like).

Honeypots have to be optimally provisioned to make it more likely they will be attacked as the real target of a malicious attack and that the attacker will continue interacting and engaging with the honeypots. Given that it is prohibitively expensive and unreasonable to provision a dedicated high-fidelity honeypot decoy for each protected host, honeypots are typically configured with personality traits that are provisioned narrowly or broadly. Unfortunately, if a honeypot is provisioned too narrowly, the honeypot will not entice attackers who are looking for a specific type of target (e.g., an Apache web server). On the other hand, if the honeypot is provisioned so broadly such that the honeypot is vulnerable to a large variety of exploits and malicious actions, the honeypot will stand out as an obvious decoy to a sophisticated attacker. Therefore, over provisioning or under provisioning a honeypot is not ideal. Furthermore, the existing inability of a single standalone honeypot to function in an optimized manner where different personalities can be selectively presented at the same time to different attackers based on what the different attackers are looking for and/or expecting is also not desirable.

Disclosed herein are methods, systems, and processes to provision and deploy deception systems with dynamic and flexible personalities to analyze a malicious attack against a honeypot, identify the most likely vulnerability and target platform the attacker is attempting to exploit, and change the honeypot's OS and/or service personality to align with the attacker's desired target (e.g., for the remainder of an interactive session with the attacker or for a configurable time period). A single standalone honeypot can present and maintain an exclusive and unique personality for each of multiple attack sources simultaneously.

Example Multiple Personality Deception System

FIG. 1A is a block diagram 100A of a honeypot 105 that implements a personality state table (PST), according to one embodiment. Honeypot 105 as shown in FIG. 1A is a physical or virtual computing device or system that mimics a real protected host and serves as the protected host's decoy if and when the protected host is attacked as part of a malicious attack. Honeypot 105 includes at least a personality state table 110, an attack analysis engine 115, personalities 120(1)-(N), and a personality engine 125. Honeypot 105 is communicatively coupled to protected hosts 135(1)-(N) via network 140, which can be any type of network or interconnection.

Protected hosts 135(1)-(N) can be any type of virtual or physical computing devices that are protected or sought to be protected from malicious attacks in a cybersecurity computing environment that deploys honeypots. Attackers 130(1)-(N) maliciously attack or attempt to maliciously attack one or more protected hosts 135(1)-(N) using vulnerabilities, exploits, and the like, via network 140. As shown in FIG. 1A, honeypot 105, via personality engine 125, presents personality 120(1) to attacker 130(1) and personality 120(N), a different personality than personality 120(1), to attacker 130(N). It should be noted that a single honeypot—honeypot 105—can present a different personality to two or more attackers simultaneously.

In one embodiment, honeypot 105 is capable of implementing multiple network, operating system (OS), and service personalities. These different types of personalities are discussed further with respect to FIGS. 2C-2E, infra. In this example, personalities 120(1)-(N) are an expression of predefined configuration settings (e.g., open network ports, service banners, service response values, and/or strings, Transmission Control Protocol/Internet Protocol (TCP/IP) flags, and the like).

In another embodiment, PST 110 is a construct internal to honeypot 105 and permits honeypot 105 to store and look up information/data necessary to present a consistent profile to an attacker (or attacking network range). In this example, PST 110 is useable by attack analysis engine 115, personalities 120(1)-(N), and personality engine 125—e.g., by various internal components of honeypot 105 participating in presenting the attacker with a personality. Honeypot 105 can share PST 110 with protected hosts 135(1)-(N), a honeypot management server (not shown in FIG. 1A), and other honeypots (also not shown in FIG. 1A), in network 140 or another network.

Attack analysis engine 115, implemented by honeypot 105, is an internal system for at least (1) analyzing attacks against honeypot 105, (2) determining the most likely OS, service, and/or vulnerability the attacker was attempting to exploit, (3) determining the best personality, within the capabilities of honeypot 105 that will entice the attacker to continue interacting with honeypot 105, (4) logging data and metrics related to steps (1)-(3) above, and (5) using exploit identification information to determine if the attack meets criteria of interest.

In some embodiments, determining the most likely OS, service, and/or vulnerability the attacker was attempting to exploit involves a lookup table containing regex (e.g., a regular expression) used to fingerprint the incoming traffic (e.g., like an Intrusion Detection System (IDS)) with the corresponding information about target platform(s) that should be emulated. In other embodiments, logging data and metrics related to steps (1)-(3) discussed above involves transmitting the personality being presented to an attacker to a user (e.g., a cybersecurity analyst) so that analysis can be performed to understand how changes to the system of FIG. 1A impacts (attacker) engagement rates. In certain embodiments, using exploit identification information to determine if the attack meets criteria of interest involves determining whether an internal IP address is leveraging an exploit for a vulnerability announced within the last "x" number of days, and if so, performing logging, alerting, and/or other actions relevant to a high risk event.

Figure 1B:
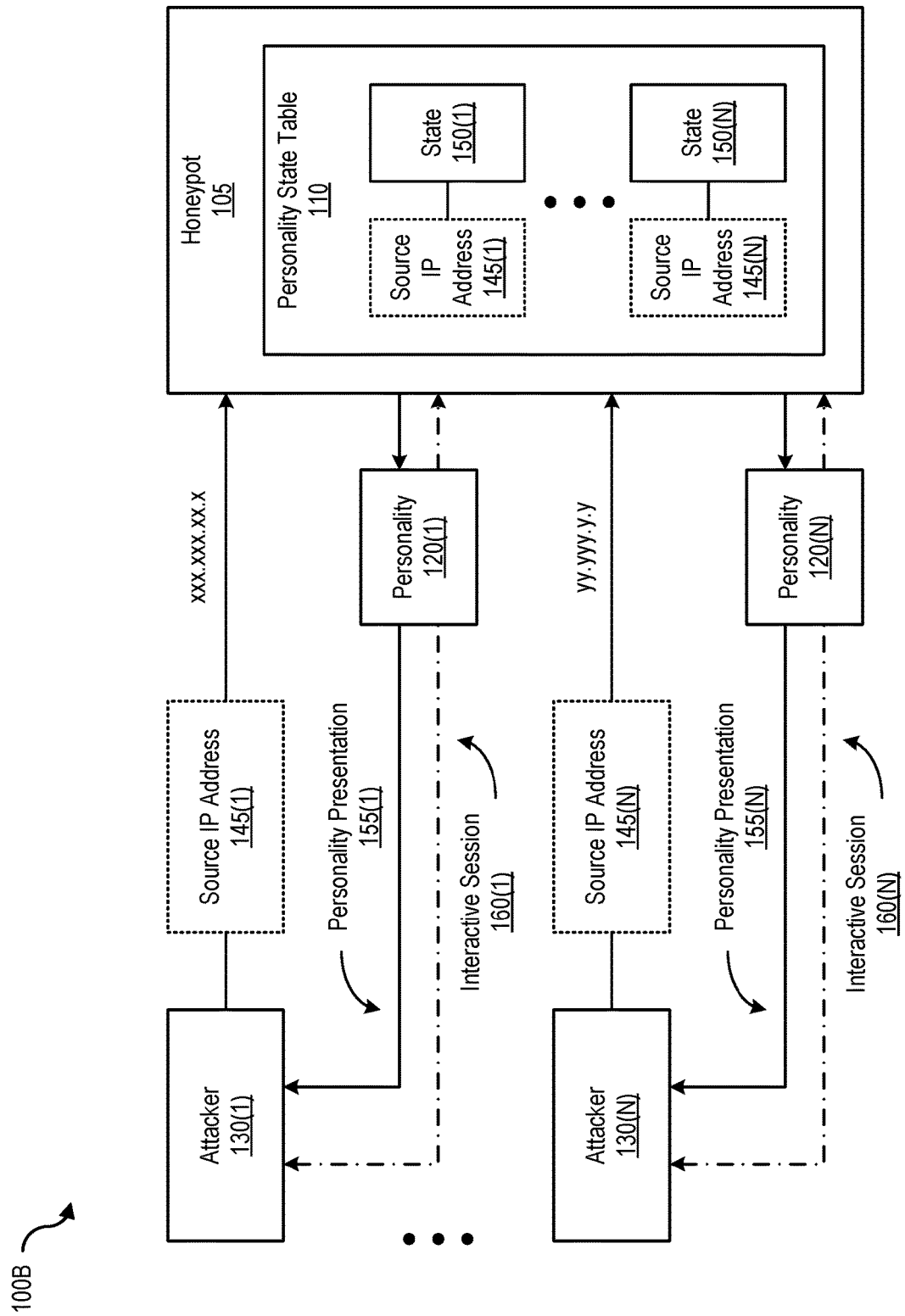
FIG. 1B is a block diagram 100B of a multiple personality deception system, according to one embodiment of the present disclosure.

FIG. 1B is a block diagram 100B of a multiple personality deception system, according to one embodiment. As shown in FIG. 1B, a first network connection is received from a first source IP address (e.g., source IP address 145(1)) at honeypot 105. In response to receiving the first network connection, honeypot 105 accesses PST 110 and determines whether a first personality (e.g., personality 120(1)) that corresponds to the first source IP address exists in PST 110. If the personality exists (e.g., state 150(1)), honeypot 105 designates the first personality to the first source IP address. Also as shown in FIG. 1B, honeypot 105 receives a second network connection from a second source IP address (e.g., source IP address 145(N)), accesses PST 110, determines that a second personality (e.g., state 150(N)) that corresponds to the second source IP address exists in PST 110, and designates the second personality to the second source IP address. However, if the first and/or second personality do not exist in PST 110, personality engine 125 determines an attack characteristic of the first and second network connections, respectively, and designates an alternate personality in PST 110 that is substantially similar to the attack characteristic(s).

In the above example, the first and second network connections include first and second incoming malicious attacks, respectively, that are generated by different attackers and intended for first and second production hosts, respectively. The attack characteristic identifies one or more OS features of the first and second production hosts expected or sought by one or more exploits associated with the first and second incoming malicious attacks, respectively. As noted, personality engine 125 can generate respective alternate personalities (e.g., a first alternate personality and a second alternate personality) if the alternate personalities do not exist and can modify PST 110 to include the alternate personalities (e.g., one for each source IP address).

In one embodiment, designating the first personality (e.g., personality 120(1)) to the first source IP address (e.g., source IP address 145(1)) includes exclusively presenting the first personality to attacker 130(1) as personality presentation 155(1) for a first duration of time (e.g., for the duration of interactive session 160(1)). In another embodiment, designating the second personality (e.g., personality 120(N)) to the second source IP address (e.g., source IP address 145(N)) includes exclusively presenting the second personality to attacker 130(N) as personality presentation 155(N) for a second duration of time (e.g., for the duration of interactive session 160(N)). Therefore, a single honeypot (e.g., honeypot 105) can present two different personalities to two different attackers (or attacker network ranges) at the same time.

Although honeypot 105 can attempt to designate an alternate personality that is substantially similar to an attack characteristic of a given attack if a (preexisting) personality associated with the source IP address of the attack does not exist in a personality state table, there may be situations where even the alternate personality is not substantially similar to the attack characteristic. In these cases, honeypot 105 generates a live personality based on one or more operating profiles, and modifies the personality state table by adding the live personality to the personality state table and designating the live personality to the respective source IP address for a given duration of time. It should be noted that the term "source IP address" refers to the IP address of the attacker (or a range of IP addresses thereof). If two or more attackers initiate a simultaneous attack, each attacker would be presented with a different view of the same honeypot (e.g., for a period of time) by personality engine 125. Therefore, as shown in FIG. 1B, each connection from a given IP address (or a given range of IP addresses) is presented with the same profile/state/personality by personality engine 125.

Examples of Generating and Presenting Disparate Honeypot Personalities

Figures 2A, 2B:
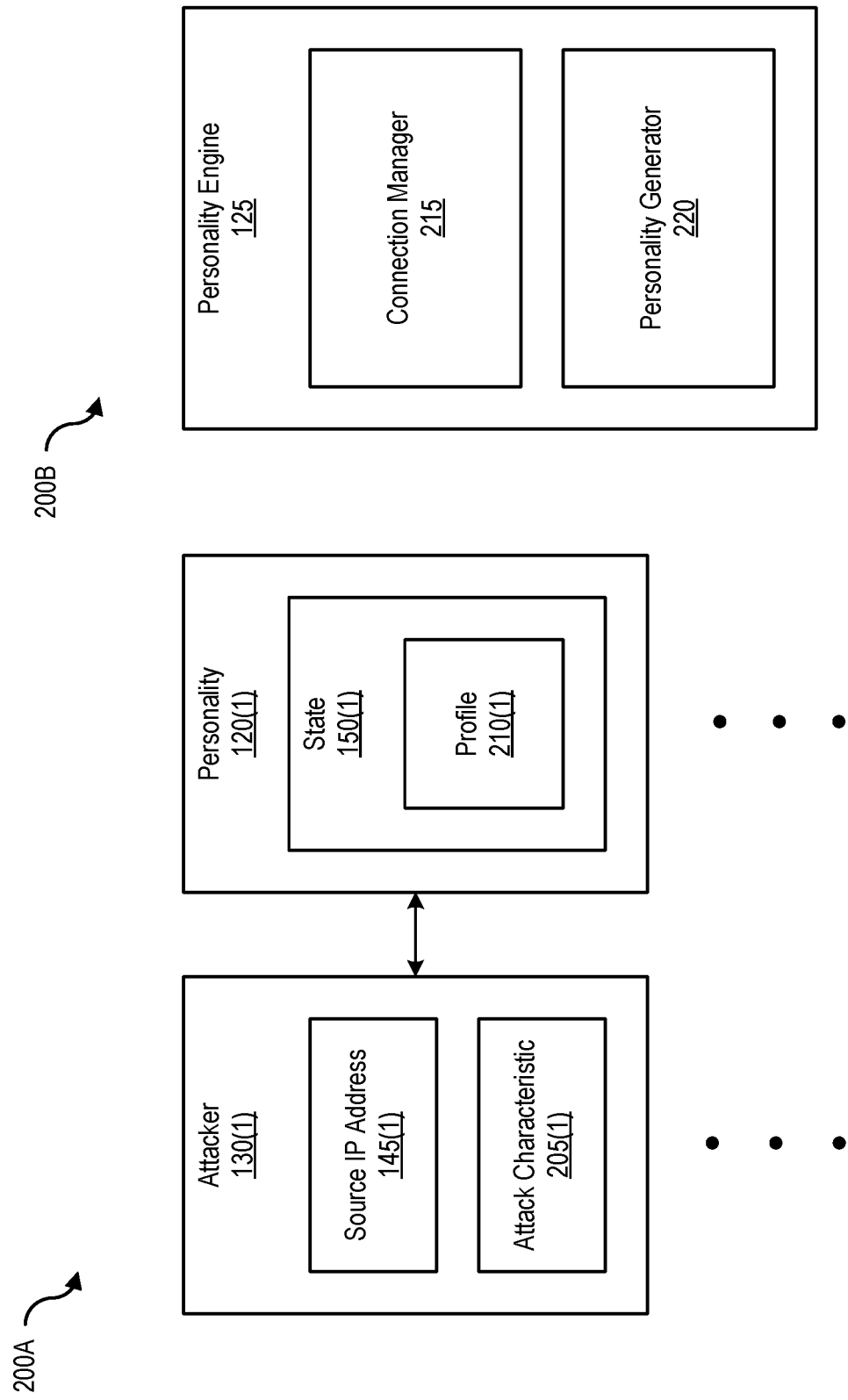
FIG. 2A is a block diagram 200A of an attacker and a personality, according to one embodiment of the present disclosure.
FIG. 2B is a block diagram 200B of a personality engine, according to one embodiment of the present disclosure.

FIG. 2A is a block diagram 200A of an attacker and a personality, according to one embodiment. Attacker 130(1) is associated with source IP address 145(1) and an attack characteristic 205(1). For example, if attacker 130(1) utilizes a Windows-based exploit (e.g., EternalBlue), honeypot 105 is presented as a Windows computing system to attacker 130(1). Therefore, in this example, attack characteristic 205(1) of attacker 130(1) initiating a malicious attack from source IP address 145(1) is "EternalBlue-Windows." In other examples, attack characteristic 205(1) can include other features (e.g., web server), data (e.g., employee database), functions (e.g., Storage Area Network (SAN) storage), and the like, of a protected host sought or expected by attacker 130(1).

Personality 120(1) includes state 150(1), which further includes a profile 210(1). State 150(1) with a corresponding profile 210(1) defines personality 120(1). For example, personality 120(1) associated with source IP address 145(1) can include state 150(1) of a protected host at a given point in time (e.g., state of applications, network and storage configurations, data state, active OS services, and the like, prior to, during, or after a previous malicious attack). Profile 210(1) includes particular manifestations of state 150(1)— e.g., status of a web server, status of network connections (e.g., with other protected hosts or servers), storage device information, snapshot(s) of data, active and inactive OS services, and the like.

The foregoing particular manifestations are used to create profile 210(1) by personality engine 125, which also correlates profile 210(1) to a point in time state of a given protected host (e.g., state 150(1)). This correlation results in personality 120(1) which is a high-fidelity mimicry of the protected host in question. Personality 120(1) is maintained in a personality state table to be served or presented to a specific IP address upon (malicious) attack detection (e.g., by attack analysis engine 115). As noted, if personality 120(1) is unavailable in PST 110, personality 120(1) can be created as a live personality. The concept of generating a live personality is discussed in greater detail with respect to FIG. 2F, infra. Therefore, a single standalone honeypot can, among other things, (1) identify what an attacker is trying to attack (e.g., what profile matches best), (2) use a state table to determine personality presentation and if available, identify a suitable personality, and (3) create a new personality if one is unavailable in the state table.

FIG. 2B is a block diagram 200B of a personality engine, according to one embodiment. Personality engine 125 includes at least a connection manager 215 and a personality generator 220. Connection manager 215 detects an incoming malicious attack and determines whether the attack is associated with a particular protocol or behavior that is emulated by honeypot 105 so that personality generator 220 can identify (e.g., in a state table) or generate an appropriate or suitable personality for honeypot 105 to present to the attacker. Therefore, personality generator 220 either locates a profile that corresponds to a specific IP address in a personality state table maintained by honeypot 105 or generates a live personality that best matches the attack characteristic of the incoming malicious attack. Because personality state table is maintained by honeypot 105 as a centralized construct, personality generator 220 can present a first personality to a first attacker, a second personality to a second attacker, and so on.

FIG. 2C is a block diagram 200C of an attack characteristic, according to one embodiment. Attack characteristic 205(1) includes at least an exploit 225(1) and one or more operating features 230(1)-(N). An exploit is a piece of software, a chunk of data, or a sequence of commands that takes advantage of a bug or vulnerability to cause unintended or unanticipated behavior to occur on a protected host. Operating features 230(1)-(N) include particular protocols or behaviors that are sough or expected by an attacker and that are associated with a particular exploit. For example, the EternalBlue exploit has at least two operating features (out of many) that include "Windows" and "Server Message Block" (SMB) because EternalBlue seeks to exploit vulnerabilities in the SMB protocol provided by the Windows OS.

FIG. 2D is a block diagram 200D of a personality, according to one embodiment. Personality 120(1) includes at least services 235(1)-(N), each with corresponding configuration metadata 240(1)-(N) as well as an operating system 245 and a banner 250 (e.g., a server banner). In one embodiment, at least the foregoing four components can be combined to generate a personality for a honeypot much faster than provisioning a dedicated honeypot clone because the personality state table maintained by the honeypot provides a modifiable and updateable tracking construct that aids in personality identification, personality location, and if necessary, on the fly personality generation (e.g., by using preexisting information such as services provided and corresponding configuration metadata that indicates how those services are (or were) configured on a given protected host).

FIG. 2E is a block diagram 200E of a honeypot, according to one embodiment. In addition to other components, modules, constructs, and/or engines, honeypot 105 includes at least a disk 255, a personality 120 with operating features 230(1)-(N), and personality engine 125. Honeypot 105 interacts with source IP address 145 and transmits personality 120 to source IP address 145. As noted in the discussion with respect to FIGS. 2A and 2D, supra, one (type of) personality characteristic that is required to optimally provision a honeypot personality to present to an attacker requires mimicking one or more services that are targeted by the attacker, one or more services that are part of a protected host that is being emulated, or one or more services that are expected by an attacker and their particular attack characteristic (e.g., the type of exploit used, the type of vulnerability taken (or sought to be) advantage of, and the like).

Also as noted, time is of the essence when it comes to provisioning a personality on the fly based on attack detection indicating an imminent or ongoing malicious attack. Therefore, in one embodiment, because a profile is an integral part of a personality, honeypot 105 stores profiles 210(1)-(N) on disk 255 for quick access and retrieval. Personality engine 125 then combines one or more profiles along with one or more operating features to generate personality 120 that is then transmitted or presented to source IP address 145 by honeypot 105. In this example, in addition to one or more profiles, personality engine 125 also includes one or more services 235(1)-(N) along with their corresponding configuration metadata 240(1)-(N) to generate personality 120. It should be noted that a personality is a software construct that is presented to source IP address 145, whereas a profile is a software construct that is maintained on-disk (or in-memory)—a configuration or a fixed expression necessary to express the personality.

The benefit of personality engine 125 being able to add a service and accompanying configuration metadata to a profile prior to personality generation permits personality updates to be performed on the fly. For example, attack analysis engine 115 can inform personality engine 125 that the attacker is initiating an SMB-related attack and that the attacker is looking for a particular network share as part of the attack. Because profiles can be supplemented with services and corresponding configuration metadata by personality engine 125, the particular network share sought by the attacker as part of a greater attack can be added to the honeypot that is standing in for the protected host. Therefore, as shown in FIGS. 2A-2E, honeypot 105 can present disparate personalities to different attackers to maintain and bolster attacker engagement and interaction.

Example of Live Personality Generation and Presentation

Figure 2F:
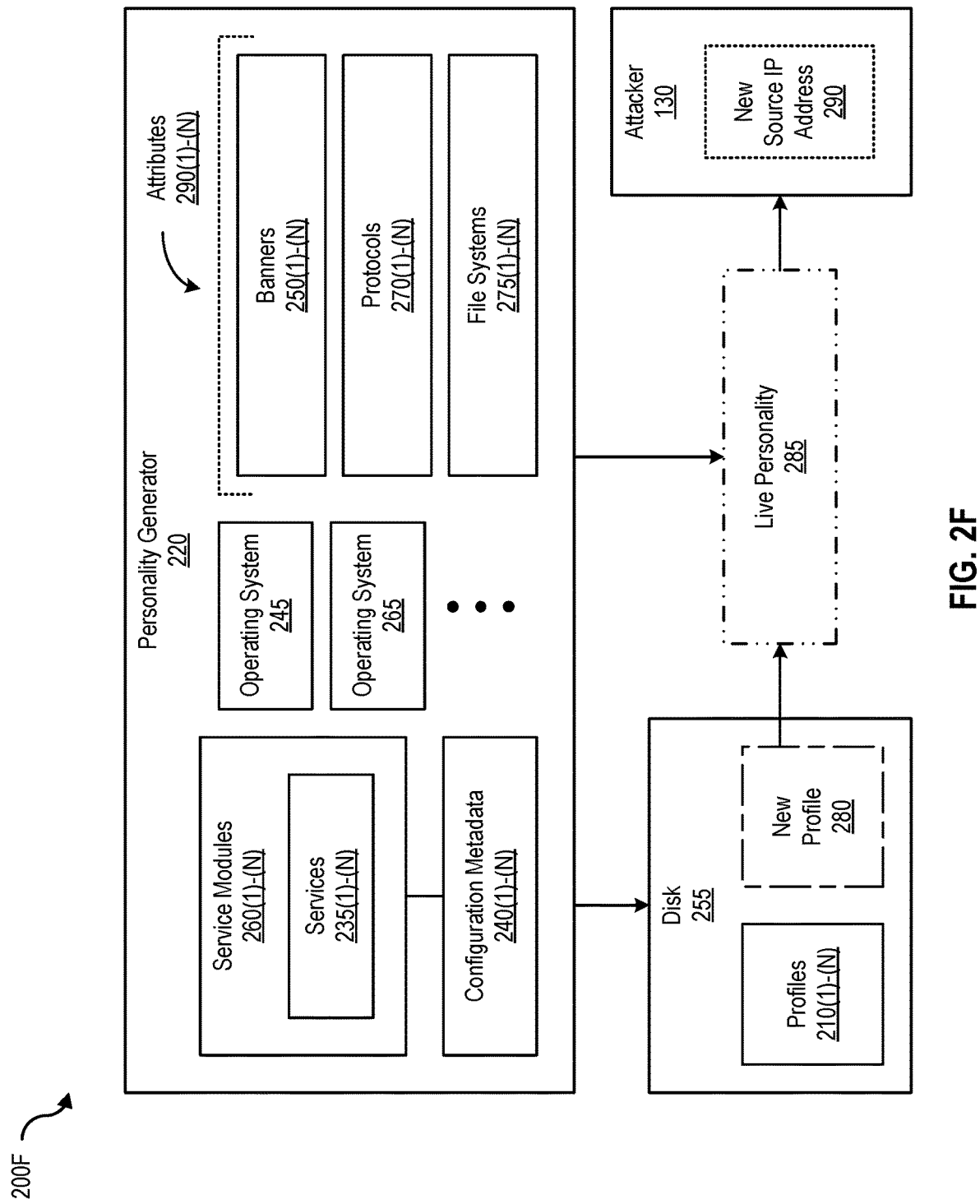
FIG. 2F is a block diagram 200F of a personality generator, according to one embodiment of the present disclosure.

FIG. 2F is a block diagram 200F of a personality generator, according to one embodiment. As previously noted, a personality state table (e.g., PST 110 as shown in FIG. 1) may not have an appropriate or suitable personality to present to an attacker, particularly if the attacker is a new attacker (e.g., a malicious attack initiated and received from a new source IP address). To account for this limitation, personality generator 220 shown in FIG. 2F can generate and present a live personality a new attack source.

Personality generator 220 includes at least service modules 260(1)-(N) that execute services 235(1)-(N) with associated and corresponding configuration metadata 240(1)-(N). Personality generator 220 also includes various operating systems (e.g., OS 245, OS 265, and the like) as well as attributes 290(1)-(N) (which include banners 250 (1)-(N), protocols 270(1)-(N), and file systems 275(1)-(N), in addition to other attributes). Because personality engine 125 can update a personality on the fly (e.g., to account for a network share, as discussed above), personality generator 220 which is implemented by personality engine 125 has the capability to generate a live personality 285.

Unfortunately, because a live personality does not have the benefit of information contained in a personality state table, the previous state of a protected host, or other historical information, a new profile that is as accurate as possible (e.g., in terms of attacker expectation) has to be generated with more personality characteristics than is required to merely update an already existing personality. Therefore, in one embodiment, a new profile 280 is generated by personality generator 220 on disk 255 using a combination of services and configuration metadata (e.g., metadata indicative of the behavior of a listening service), an operating system (e.g., Windows for EternalBlue for example), and a combination of one or more banners (e.g., a web server banner), protocols (e.g., network and/or storage protocols), and/or file systems.

By supplementing a profile with not only services with configuration metadata and operating system information but also attributes such as banners, protocols, and file systems, live personality 285 can be generated and presented to an attacker 130 (with a new source IP address 290). At the same time, the (existing) personality state table (e.g., PST 110) can be updated to include new source IP address 290, new profile 280, and live personality 285.

Example Personality State Table

FIG. 3 is a table 300 that illustrates a personality state table (PST), according to one embodiment. Personality state table 305 is one example of PST 110 shown in FIG. 1A. Personality state table 305 includes at least the following fields: a network connection field 310, a source IP address field 315, an exploit or vulnerability field 320, a personality trait(s) field 325, a personality required field 330, a personality availability field 335, and an action required field 340.

In one embodiment, a network connection 345(1) with source IP address 69.89.31.226 initiates a malicious attack using EternalBlue with personality traits SMB and Windows. Because personality engine 125 has (local) access to personality state table 305, personality engine 125 is able to determine that personality 120(1) is the most appropriate and/or suitable personality for source IP address 69.89.31.226 and is available for presentation. Personality engine 125 then designates personality 120(1) to source IP address 69.89.31.226, and honeypot 105 presents source IP address 69.89.31.226 personality 120(1) (e.g., for a given duration of time).

In another embodiment, a network connection 345(2) with source IP address 172.16.254.1 initiates a malicious attack using Cloudbleed with a personality trait Cloudflare proxy. Personality engine 125 determines that personality 120(2) is the most appropriate and/or suitable personality for source IP address 172.16.254.1 and is available for presentation. Personality engine 125 then designates personality 120(2) to source IP address 172.16.254.1, and honeypot 105 presents source IP address 172.16.254.1 personality 120(2). Therefore, a single honeypot (e.g., honeypot 105) is able to present different personalities to different attack sources based on attack characteristics or based on a personality state contained in personality state table 305 as shown in FIG. 3.

In some embodiments, a network connection 345(3) with source IP address 216.58.216.164 initiates a malicious attack using Apache Struts with a personality trait Java. Personality engine 125 determines that the required personality trait (e.g., 120(3)) is unavailable in personality state table 305, and therefore instructs personality generator 220 to create a new personality (e.g., live personality 285) for source IP address 216.58.216.164 (e.g., using a combination of services/configuration metadata, operating system information, and one or more attributes such as banners, protocols, file systems, and the like).

In other embodiments, personality engine 125 designates and presents unique personalities to network connections 345(4) and 345(6) and creates a new personality for network connection 345(5). Because the appropriateness or suitability of a personality presented by a honeypot to a source IP address of an attack(er) can depend on an attack characteristic (e.g., exploit or vulnerability and associated personality traits that are required to validate the exploit or the vulnerability), personality engine 125 can access personality state table 305 to determine which personality to present to an attacker if a suitable/appropriate personality exists, or can instruct personality generator 220 to generate a new (live) personality to present to the attacker, while still accounting for attacker expectations when it comes to services, service configurations, operating systems, banners, protocols, file systems, and the like.

Example Processes to Provision Multiple Personality Deception Systems

Figure 4A:
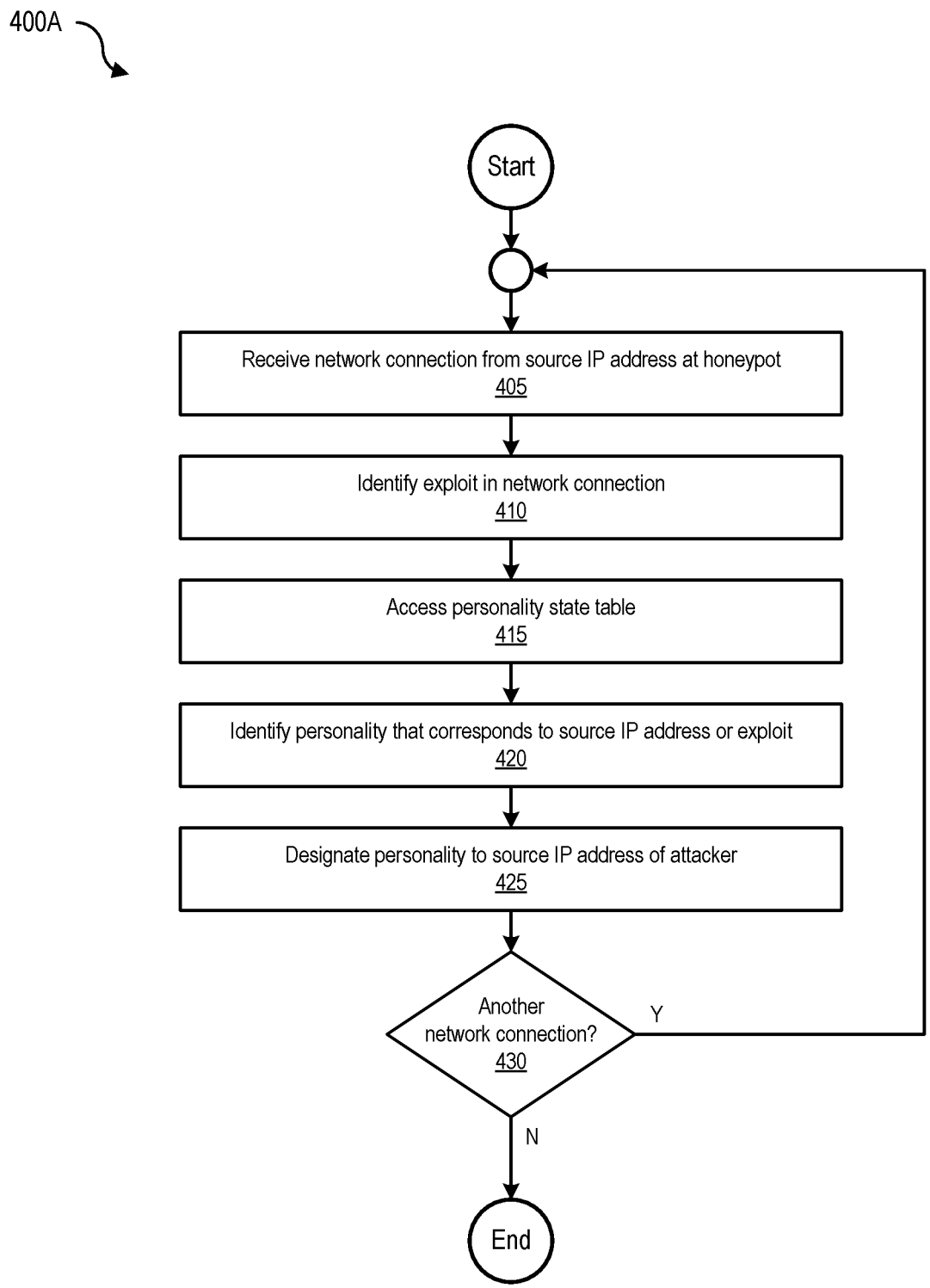
FIG. 4A is a flowchart 400A that illustrates a process for designating a honeypot personality, according to one embodiment of the present disclosure.

FIG. 4A is a flowchart 400A that illustrates a process for designating a honeypot personality, according to one embodiment. The process begins at 405 by receiving a network connection (that includes a malicious attack) from a source IP address (or a range of source IP addresses) at a honeypot. At 410, the process identifies an exploit in the network connection (e.g., EternalBlue, and the like), and at 415, accesses a personality state table (that is maintained locally by the honeypot as shown in FIG. 1A).

At 420, the process identifies a personality that corresponds to (or correlates with) the source IP address or exploit (e.g., a profile on disk that can accurately express a personality that is sought or expected when a protected host is attacked using a particular exploit or vulnerability). At 425, the process designates the personality to the source IP address of the attacker (e.g., for a limited duration of time to maintain and bolster attacker engagement and interaction with the honeypot). At 430, the process determines if there is another network connection. If there is another network connection, the process loops to 405. Otherwise, the process ends.

Figure 4B:
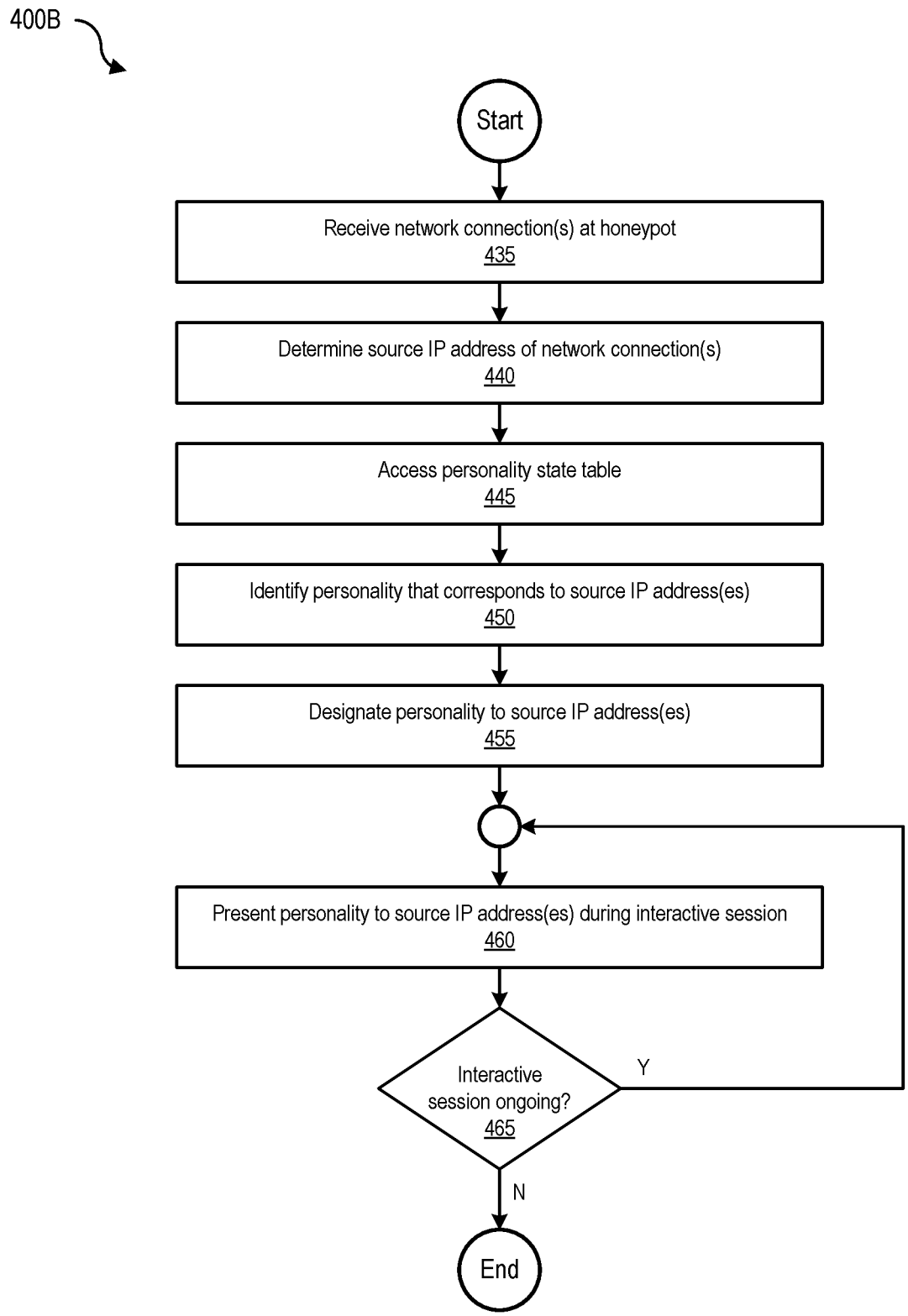
FIG. 4B is a flowchart 400B that illustrates a process for presenting a personality during an interactive session, according to one embodiment of the present disclosure.

FIG. 4B is a flowchart 400B that illustrates a process for presenting a personality during an interactive session, according to one embodiment. The process begins at 435 by receiving one or more (simultaneous) network connections at a honeypot. At 440, the process determines the source IP address(es) (or a range thereof) of the network connection(s), and at 445, access a personality state table (e.g., personality state table 305 as shown in FIG. 3).

At 450, the process identifies a personality that corresponds to the source IP address(es). As noted, personality presentation involves presenting a profile as well as additional metadata (e.g., established host names, security information, configuration metadata, and the like) and storing the presentation state in the personality state table. In this manner, a known attacker is consistently presented with the same profile and (the most) previous state that enhances current attacker interaction while maintaining the secrecy of the target of the interaction.

At 455, the process designates the personality to the source IP address(es), and at 460, presents the personality to the source IP address(es) during the interactive session. In one embodiment, the personality is presented to the source IP address only during an interactive session (e.g., an initial interactive session and a follow up interactive session). At 465, the process determines if the interactive session is ongoing (e.g., whether a considerable amount of time (e.g., 1 or 2 weeks) has lapsed since the source IP address has interacted with the honeypot). If the interactive session is ongoing, the process loops to 460. Otherwise, the process ends.

Figure 5A:
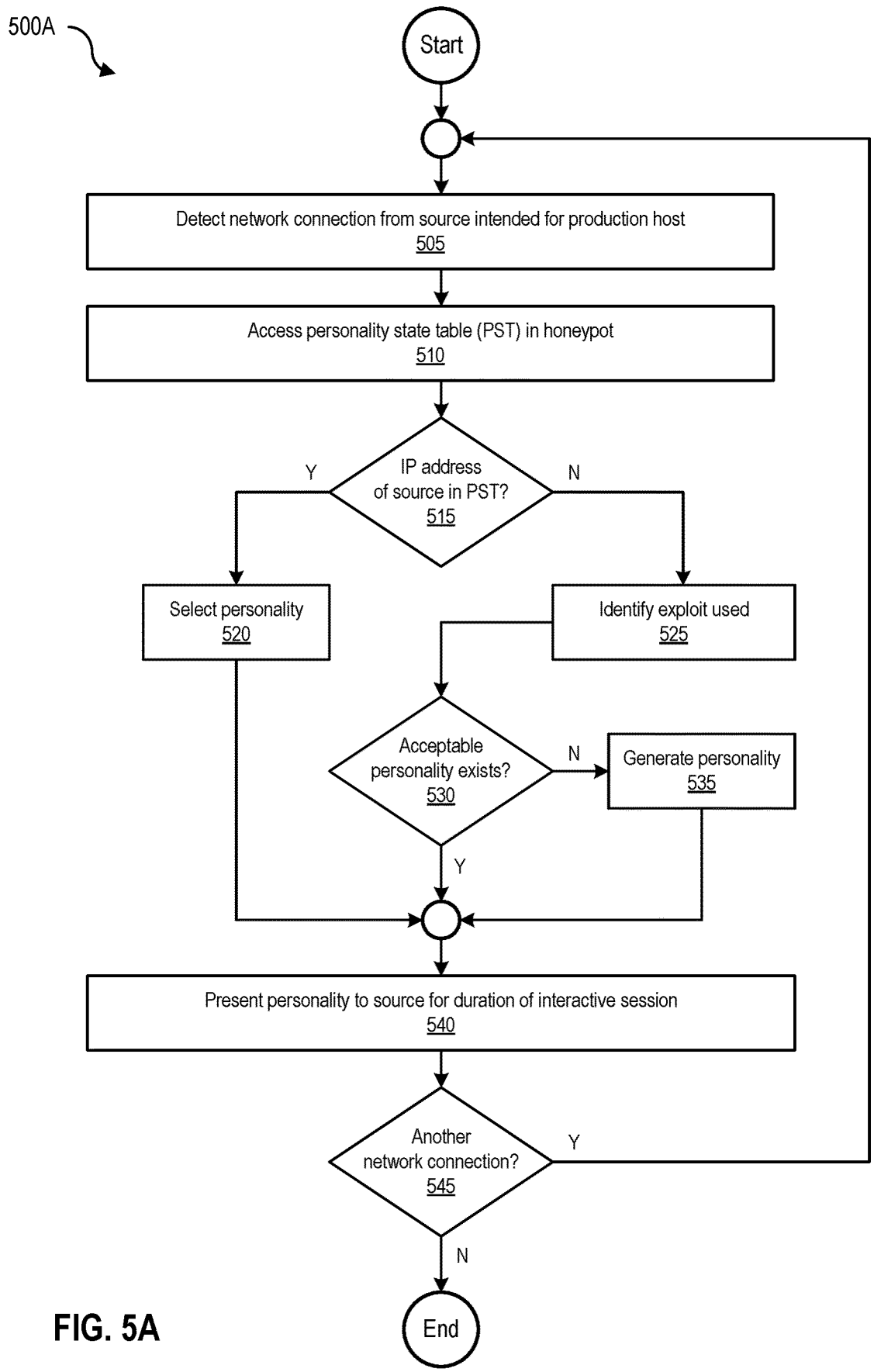
FIG. 5A is a flowchart 500A that illustrates a process for selecting or generating a personality, according to one embodiment of the present disclosure.

FIG. 5A is a flowchart 500A that illustrates a process for selecting or generating a personality, according to one embodiment. The process begins at 505 by detecting a network connection from a source (e.g., attack source) intended for a production host. At 510, the process accesses a personality state table in a honeypot (e.g., PST 110 in honeypot 105 as shown in FIG. 1A). At 515, the process determines whether the IP address of the source is in the PST. If the IP address of the source is in the PST, the process, at 520, selects the personality (in the PST). However, if the IP address of the source is not in the PST, the process, at 525, identifies the exploit used and, at 530, determines whether an acceptable personality exists.

If an acceptable (or suitable) personality does not exist in the PST (e.g., if the attacker is a new attacker or the personality state table was not updated after a previous interaction), the process, at 535, generates a personality (e.g., live personality 285 as shown in FIG. 2F). Upon selecting a personality (step 520) or upon generating a (new or live) personality (step 535), the process, at 540, presents the (selected or generated) personality to the source for the duration of the interactive session (e.g., the personality is persisted long enough to keep the attacker engaged). At 545, the process determines if there is another network connection. If there is another network connection, the process loops to 505. Otherwise, the process ends.

Figure 5B:
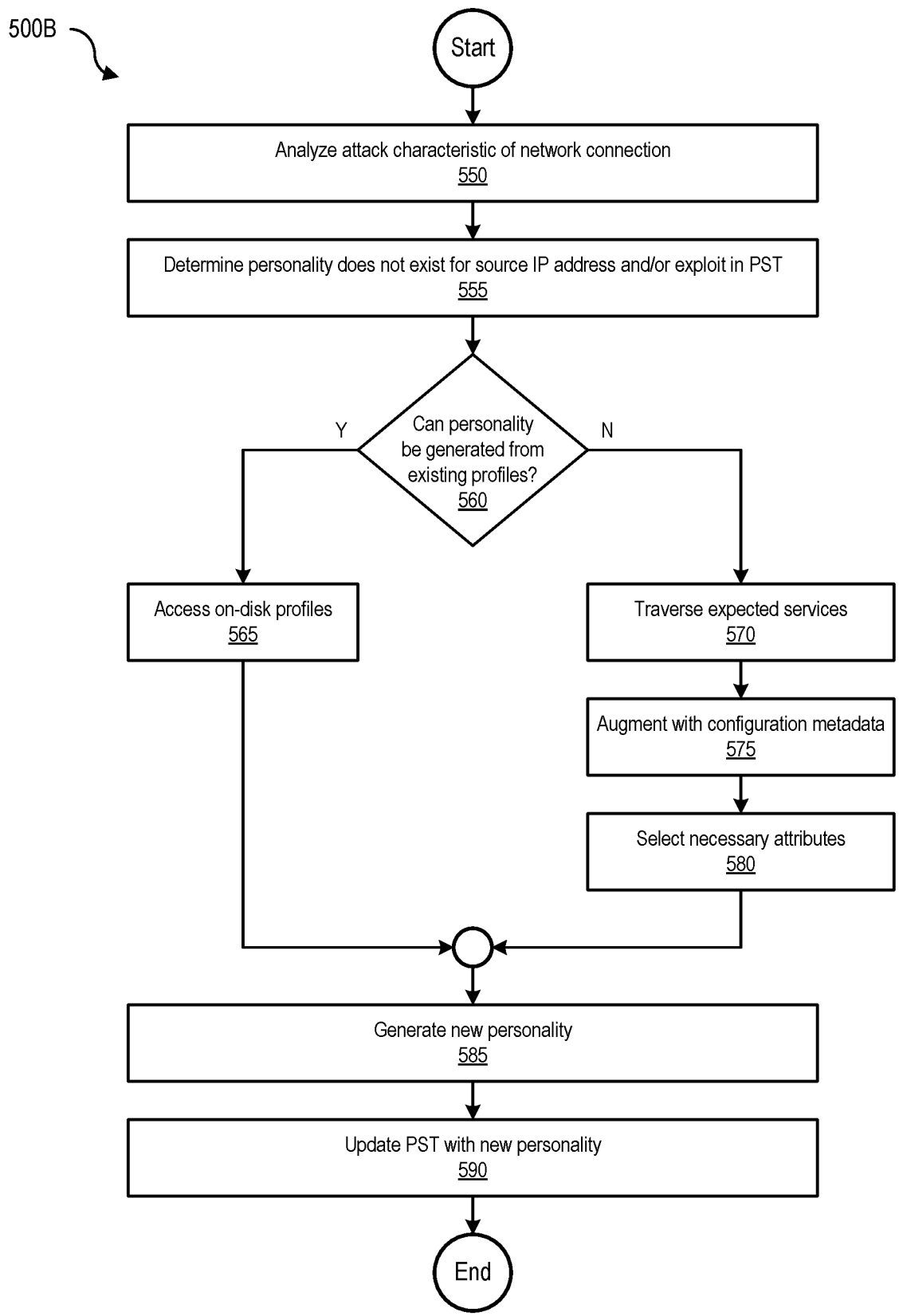
FIG. 5B is a flowchart 500B that illustrates a process for updating a personality state table, according to one embodiment of the present disclosure.

FIG. 5B is a flowchart 500B that illustrates a process for updating a PST, according to one embodiment. The process begins at 550 by analyzing an attack characteristic of a network connection, and at 555, determines that a personality does not exist for a source IP address and/or exploit in the personality state table. At 560, the process determines whether a (new) personality can be generated from existing profiles (e.g., whether existing on-disk profiles are close (or similar) enough to the attack characteristic and whether they contain one or more operating features that are part of and/or similar to the attack characteristic).

If a personality can be generated from existing profiles, the process, at 565, accesses on-disk profiles. However, if a personality cannot be generated from existing profiles, the process, at 570, traverses expected services (e.g., a listening service), at 575, augments the expected services with configuration metadata (e.g., metadata that indicates how a given service should be configured for a given personality), and at 580, selects necessary attributes (e.g., protocols, banners, file systems, and the like). At 585, the process generates a new personality and ends at 590 by updating the personality state table with the new personality (e.g., a profile with corresponding services, configuration metadata, operating system, protocols, banners, file systems, and the like).

Figure 6:
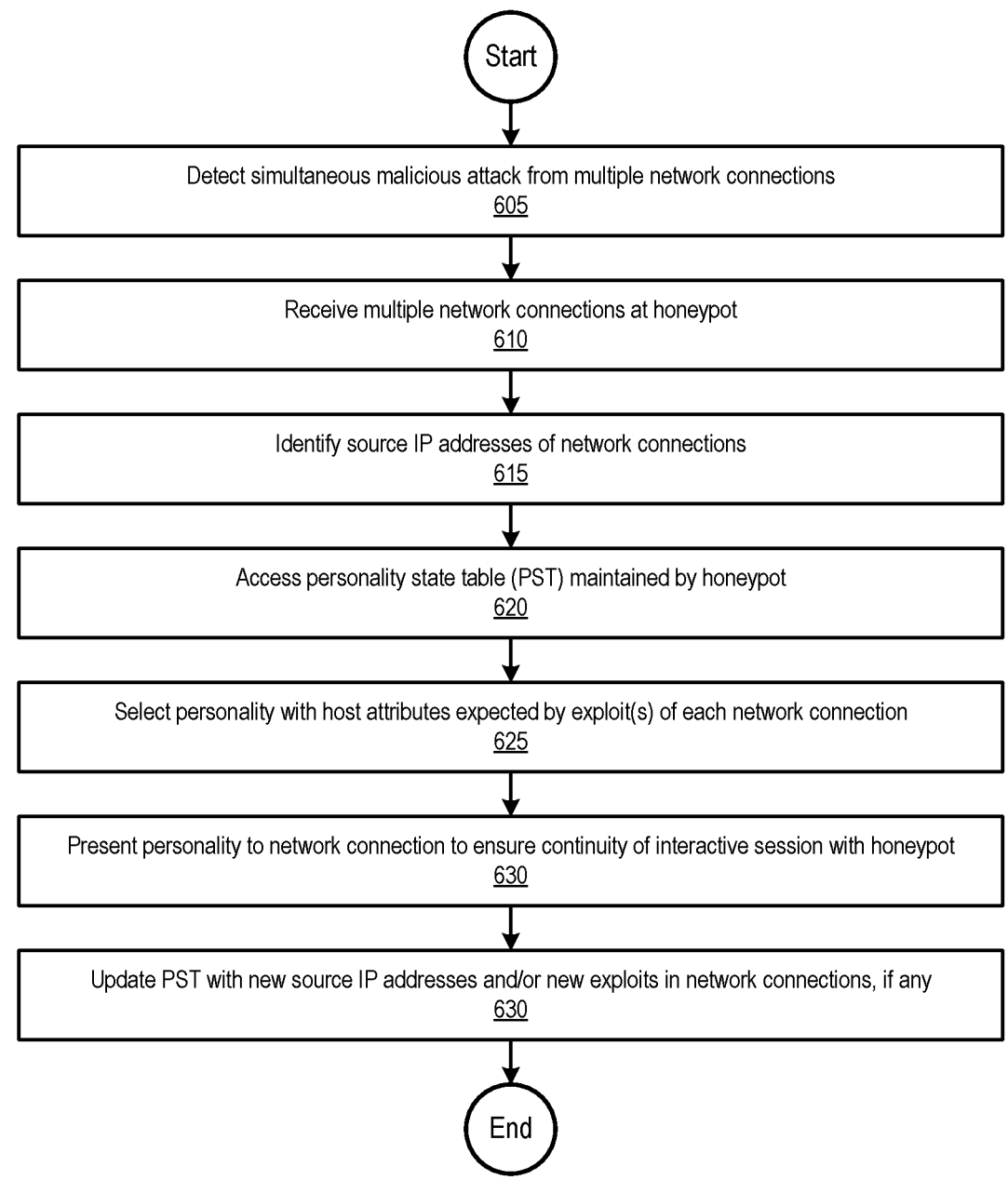
FIG. 6 is a flowchart 600 that illustrates a process for processing multiple network connections at a honeypot, according to one embodiment of the present disclosure.

FIG. 6 is a flowchart 600 that illustrates a process for processing multiple network connections at a honeypot, according to one embodiment. The process begins at 605 by detecting simultaneous malicious attacks from multiple network connections, and at 610, receives multiple network connections at a honeypot. At 615, the process identifies the source IP addresses of the network connections, and at 620, access a personality state table maintained by the honeypot (e.g., PST 110 as shown in FIG. 1A or personality state table 305 of FIG. 3).

At 625, the process selects a personality with host attributes (e.g., attributes 290 (1)-(N)) that are expected (or sought) by exploit(s) of each network connection (e.g., a particular protocol or type of banner). At 630, the process presents the personality to the network connection to ensure continuity of the interactive session with the honeypot. The process ends at 630 by updating the personality state table with new source IP addresses or new exploits in the network connection(s), if any (e.g., if a new attack source or attack vector is discovered or detected during the attack analysis process).

Figure 7:
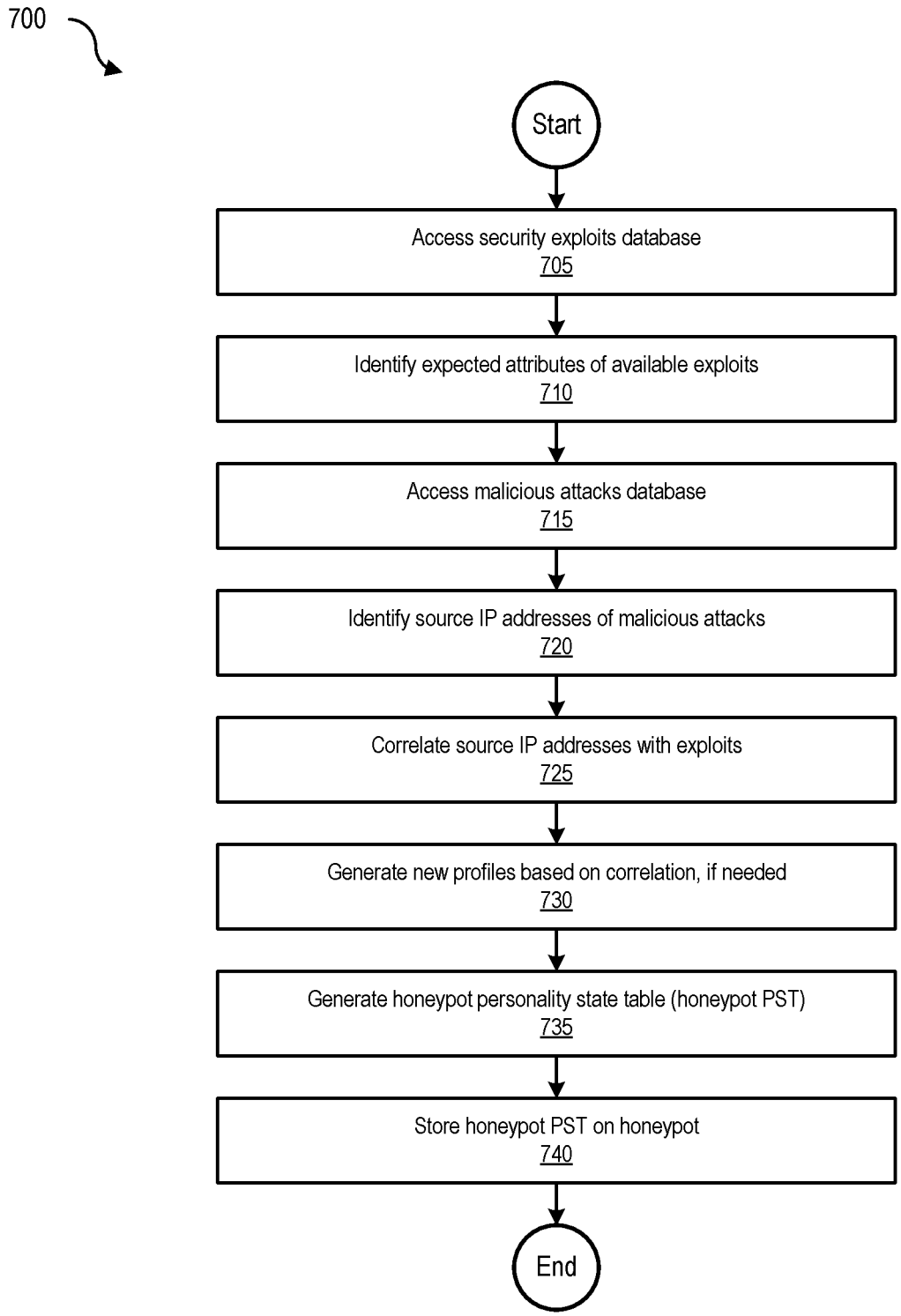
FIG. 7 is a flowchart 700 that illustrates a process for generating a personality state table, according to one embodiment of the present disclosure.

FIG. 7 is a flowchart 700 that illustrates a process for generating a PST, according to one embodiment. The process begins at 705 by accessing a security exploits database, and at 710, identifies expected attributes of available exploits (e.g., protocols, banners, services, operating systems, and the like). At 715, the process access a malicious attacks database, and at 720, identifies source IP addresses of the malicious attacks. At 725, the process correlates the source IP addresses with exploits, and at 730, generates new profiles based on the correlation, if needed. At 735, the process generates a honeypot personality state table (PST) and ends at 740 by storing the honeypot PST on the honeypot (e.g., as PST 110 on honeypot 105 as shown in FIG. 1A).

Therefore, the methods, systems, and processes disclosed herein provision and deploy deception systems with dynamic and flexible personalities to analyze a malicious attack against a honeypot, identify the most likely vulnerability and target platform the attacker is attempting to exploit, and change the honeypot's OS and/or service personality to align with the attacker's desired target, enabling a single standalone honeypot to present and maintain an exclusive and unique personality for each of multiple attack sources simultaneously while bolstering attacker interaction and engagement with the honeypot.

Example Computing Environment

Figure 8:
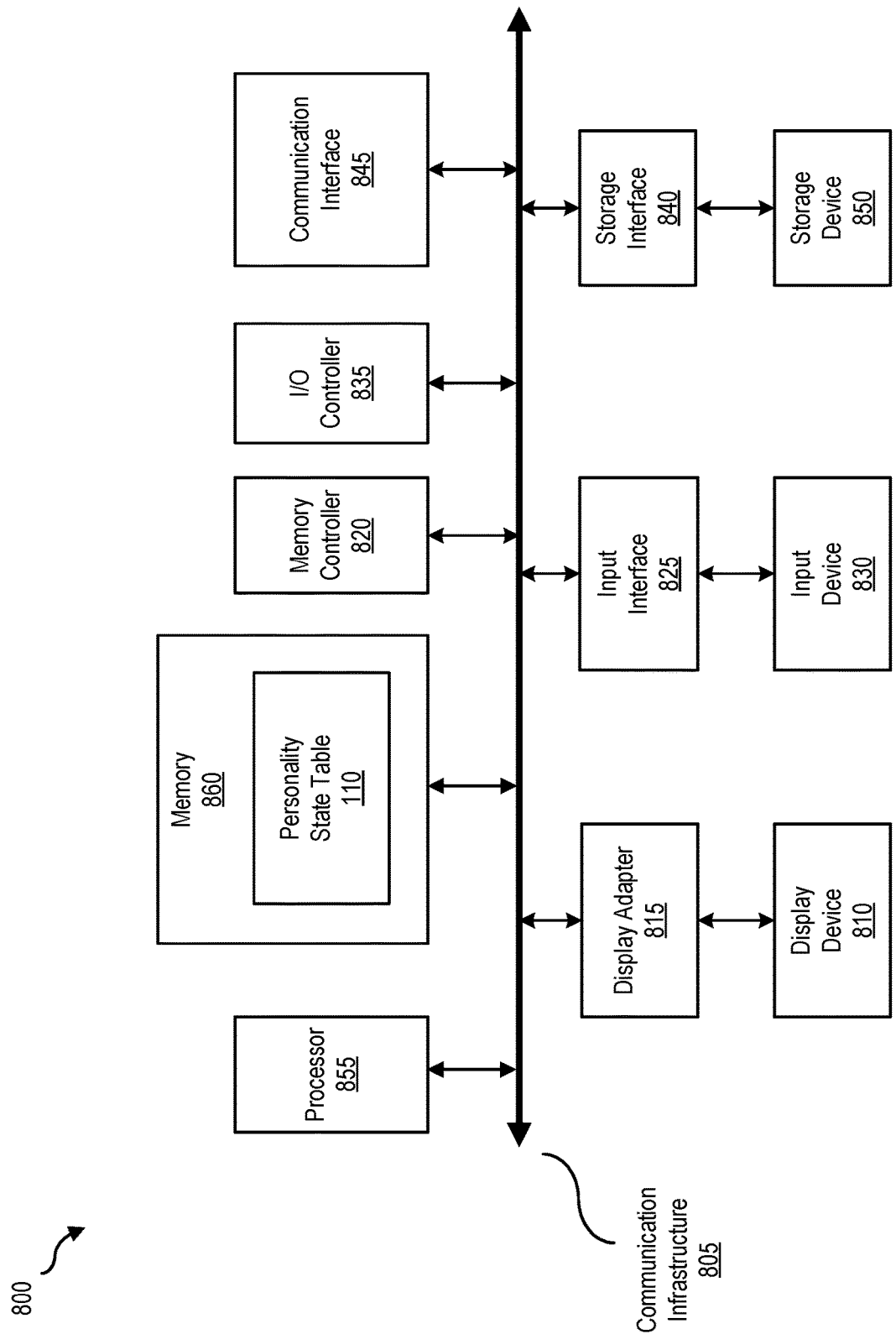
FIG. 8 is a block diagram 800 of a computing system, illustrating how a personality state table can be implemented in software, according to one embodiment of the present disclosure.

FIG. 8 is a block diagram 800 of a computing system, illustrating how a personality state table 110 can be implemented in software, according to one embodiment. Computing system 800 can include a computing device that provisions and implements honeypot 105 (e.g., in the form of a virtual machine) and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes best path manager 125, computing system 800 becomes a special purpose computing device that is configured to provision a honeypot 105 to have multiple personalities.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing personality state table 110 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware. In certain embodiments, computing system 800 can be a virtual computing system (e.g., a virtual machine) that exists on a physical computing device (e.g., a physical machine).

Example Networking Environment

Figure 9:
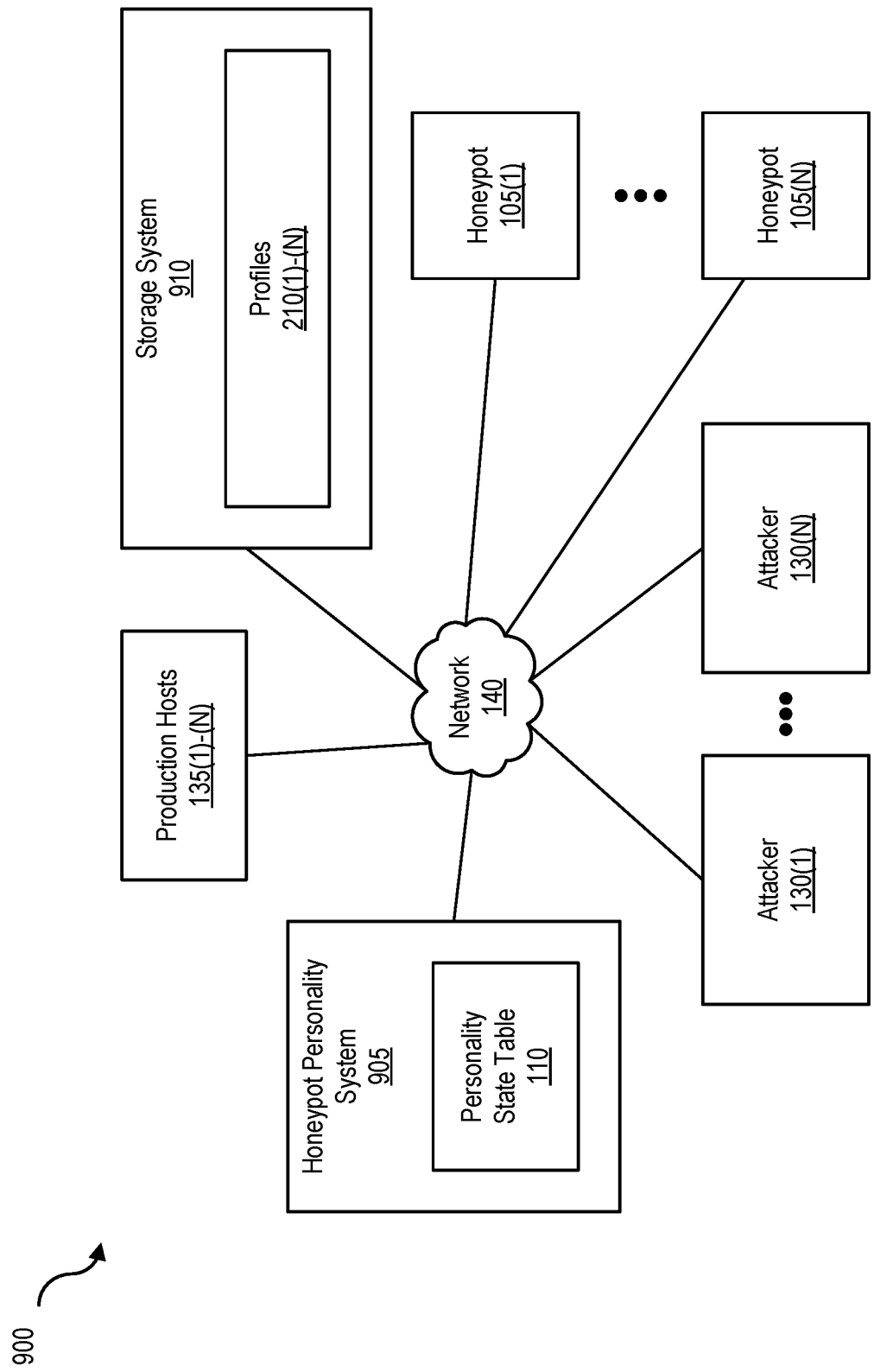
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 140 generally represents any type or form of computer network or architecture capable of facilitating communication between honeypot 105 and attackers 130(1)-(N). For example, network 140 can be a Wide Area Network (WAN) (e.g., the Internet) or a Local Area Network (LAN). In certain embodiments, a communication interface, such as communication interface 845 in FIG. 8, may be used to provide connectivity between honeypot 105, attackers 130 (1)-(N), and/or honeypot personality system 905, and network 140. The embodiments described and/or illustrated herein are not limited to the Internet or any particular network-based environment.

In some embodiments, honeypot personality system 905 may be part of honeypot 105, or may be separate. If separate, honeypot personality system 905 and honeypot 105 may be communicatively coupled via network 140. In one embodiment, all or a portion of one or more of the disclosed embodiments may be encoded as a computer program and loaded onto and executed by honeypot 105, honeypot personality system 905, or any combination thereof, and may be stored on honeypot personality system 905, honeypot 105, or storage system 910, and distributed over network 140. In some examples, all or a portion of honeypot personality system 905 or honeypot 105 may represent portions of a cloud-computing or network-based environment that may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In addition, one or more of the components described herein may transform data, physical devices, and/or representations of physical devices from one form to another. For example, personality engine 125 may transform the behavior of honeypot 105 to provision multiple personalities.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    detecting, simultaneously, a plurality of malicious attacks from a plurality of network connections;
    receiving, at a honeypot, a first network connection of the plurality of network connections and a second network connection of the plurality of network connections, both as part of an interactive session that comprises a first set of malicious attacks of the plurality of malicious attacks from the first network connection and a second set of malicious attacks of the plurality of malicious attacks from the second network connection;
    identifying a first source internet protocol (IP) address of the first network connection and a second source IP address of the second network connection;
    accessing a personality state table maintained by the honeypot;
    determining whether a first personality for the first network connection and a second personality for the second network connection can be generated from one or more existing profiles in the personality state table;
    if the first personality or the second personality can be generated from the one or more existing profiles,
        selecting, from the personality state table, and based on the first source IP address and the second source IP address, the first personality with a first set of host attributes expected by a first set of exploits presented by the first network connection as part of the first set of malicious attacks or the second personality with a second set of host attributes expected by a second set of exploits presented by the second network connection as part of the second set of malicious attacks;
    if the first personality or the second personality cannot be generated from the one or more existing profiles,
        traversing one or more services expected by the first network connection or the second network connection,
        augmenting the one or more services with configuration metadata that indicates how each service of the one or more services should be configured for the first personality or the second personality,
        selecting a first set of expected attributes expected by the first
            set of exploits presented by the first network connection or a second set of expected attributes expected by the second set of exploits presented by the second network connection, and
        generating a first alternate personality for the first network connection based on the first set of expected attributes or a second alternate personality for the second network connection based on the second set of expected attributes; and
    presenting the first personality or the first alternate personality to the first network connection and the second personality or the second alternate personality to the second network connection to ensure continuity of the interactive session with the honeypot.

2. The computer-implemented method of claim 1, further comprising:
    updating the personality state table with one or more new source IP addresses of the plurality of network connections and one or more new exploits presented by the plurality of network connections.

3. The computer-implemented method of claim 2, further comprising:
    accessing a security exploits database;
    identifying a plurality of expected attributes associated with a plurality of known exploits;
    accessing a malicious attacks database;
    identifying a plurality of existing source IP addresses associated with the plurality of known exploits;
    correlating the plurality of existing source IP addresses with the plurality of known exploits;
    generating one or more new profiles, based on the correlation;
    generating the personality state table; and
    storing the personality state table on the honeypot.

4. The computer-implemented method of claim 3, further comprising:
    if the first personality does not exist in the personality state table, generating the first alternate personality for the first network connection based on the first set of expected attributes of the plurality of expected attributes that are identified, by a first profile of the one or more profiles, as being similar to the first set of host attributes expected by the first set of exploits, by virtue of the correlation maintained by the personality state table between a first set of known exploits of the plurality of known exploits and a first existing source IP address of the plurality of existing source IP addresses.

5. The computer-implemented method of claim 4, further comprising:
    if the second personality does not exist in the personality state table, generating the second alternate personality for the second network connection based on the second set of expected attributes of the plurality of expected attributes that are identified, by a second profile of the one or more profiles, as being similar to the second set of host attributes expected by the second set of exploits, by virtue of the correlation maintained by the personality state table between a second set of known exploits of the plurality of known exploits and a second existing source IP address of the plurality of existing source IP addresses.

6. The computer-implemented method of claim 5, further comprising:
presenting, simultaneously, the first alternate personality to the first network connection and the second alternate personality to the second network connection, if the first personality and the second personality do not exist in the personality state table.

7. The computer-implemented method of claim 6, wherein
the first personality comprises a first state of a first protected host that is targeted by the first set of malicious attacks at a first point in time prior to, during, or after one or more previous malicious attacks from the first source IP address, and
as part of generating the first alternate personality, the first profile is correlated to the first state of the first protected host at the first point in time to determine similarity between the first set of expected attributes and the first set of host attributes expected by the first set of exploits and presented by the first network connection as part of the first set of malicious attacks.

8. The computer-implemented method of claim 7, wherein
the second personality comprises a second state of a second protected host that is targeted by the second set of malicious attacks at a second point in time prior to, during, or after one or more previous malicious attacks from the second source IP address, and
as part of generating the second alternate personality the second profile is correlated to the second state of the second protected host at the second point in time to determine similarity between the second set of expected attributes and the second set of host attributes expected by the second set of exploits and presented by the second network connection as part of the second set of malicious attacks.

9. A non-transitory computer readable storage medium comprising program instructions executable to:
detect, simultaneously, a plurality of malicious attacks from a plurality of network connections;
receive, at a honeypot, a first network connection of the plurality of network connections and a second network connection of the plurality of network connections, both as part of an interactive session that comprises a first set of malicious attacks of the plurality of malicious attacks from the first network connection and a second set of malicious attacks of the plurality of malicious attacks from the second network connection;
identify a first source internet protocol (IP) address of the first network connection and a second source IP address of the second network connection;
access a personality state table maintained by the honeypot;
determine whether a first personality for the first network connection and a second personality for the second network connection can be generated from one or more existing profiles in the personality state table;

if the first personality or the second personality can be generated from the one or more existing profiles,
select, from the personality state table, and based on the first source IP address and the second source IP address, the first personality with a first set of host attributes expected by a first set of exploits presented by the first network connection as part of the first set of malicious attacks or the second personality with a second set of host attributes expected by a second set of exploits presented by the second network connection as part of the second set of malicious attacks;
if the first personality or the second personality cannot be generated from the one or more existing profiles,
traverse one or more services expected by the first network connection or the second network connection,
augment the one or more services with configuration metadata that indicates how each service of the one or more services should be configured for the first personality or the second personality,
select a first set of expected attributes expected by the first set of exploits presented by the first network connection or a second set of expected attributes expected by the second set of exploits presented by the second network connection, and
generate a first alternate personality for the first network connection based on the first set of expected attributes or a second alternate personality for the second network connection based on the second set of expected attributes; and
present the first personality or the first alternate personality to the first network connection and the second personality or the second alternate personality to the second network connection to ensure continuity of the interactive session with the honeypot.

10. The non-transitory computer readable storage medium of claim 9, further comprising:
updating the personality state table with one or more new source IP addresses of the plurality of network connections and one or more new exploits presented by the plurality of network connections.

11. The non-transitory computer readable storage medium of claim 10, further comprising:
accessing a security exploits database;
identifying a plurality of expected attributes associated with a plurality of known exploits;
accessing a malicious attacks database;
identifying a plurality of existing source IP addresses associated with the plurality of known exploits;
correlating the plurality of existing source IP addresses with the plurality of known exploits;
generating one or more new profiles, based on the correlation;
generating the personality state table; and
storing the personality state table on the honeypot.

12. The non-transitory computer readable storage medium of claim 11, further comprising:
if the first personality does not exist in the personality state table, generating the first alternate personality for the first network connection based on the first set of expected attributes of the plurality of expected attributes that are identified, by a first profile of the one or more profiles, as being similar to the first set of host attributes expected by the first set of exploits, by virtue of the correlation maintained by the personality state table between a first set of known exploits of the plurality of known exploits and a first existing source IP address of the plurality of existing source IP addresses; and if the second personality does not exist in the personality state table, generating the second alternate personality for the second network connection based on the second set of expected attributes of the plurality of expected attributes that are identified, by a second profile of the one or more profiles, as being similar to the second set of host attributes expected by the second set of exploits, by virtue of the correlation maintained by the personality state table between a second set of known exploits of the plurality of known exploits and a second existing source IP address of the plurality of existing source IP addresses.

13. The non-transitory computer readable storage medium of claim 12, further comprising:

presenting, simultaneously, the first alternate personality to the first network connection and the second alternate personality to the second network connection, if the first personality and the second personality do not exist in the personality state table.

14. The non-transitory computer readable storage medium of claim 13, wherein the first personality comprises a first state of a first protected host that is targeted by the first set of malicious attacks at a first point in time prior to, during, or after one or more previous malicious attacks from the first source IP address, as part of generating the first alternate personality, the first profile is correlated to the first state of the first protected host at the first point in time to determine similarity between the first set of expected attributes and the first set of host attributes expected by the first set of exploits and presented by the first network connection as part of the first set of malicious attacks, the second personality comprises a second state of a second protected host that is targeted by the second set of malicious attacks at a second point in time prior to, during, or after one or more previous malicious attacks from the second source IP address, and as part of generating the second alternate personality the second profile is correlated to the second state of the second protected host at the second point in time to determine similarity between the second set of expected attributes and the second set of host attributes expected by the second set of exploits and presented by the second network connection as part of the second set of malicious attacks.

15. A system comprising:

one or more processors; and a memory coupled to the one or more processors, wherein the memory stores program instructions executable by the one or more processors to:

detect, simultaneously, a plurality of malicious attacks from a plurality of network connections;

receive, at a honeypot, a first network connection of the plurality of network connections and a second network connection of the plurality of network connections, both as part of an interactive session that comprises a first set of malicious attacks of the plurality of malicious attacks from the first network connection and a second set of malicious attacks of the plurality of malicious attacks from the second network connection;

identify a first source internet protocol (IP) address of the first network connection and a second source IP address of the second network connection;

access a personality state table maintained by the honeypot;

determine whether a first personality for the first network connection and a second personality for the second network connection can be generated from one or more existing profiles in the personality state table;

if the first personality or the second personality can be generated from the one or more existing profiles, select, from the personality state table, and based on the first source IP address and the second source IP address, the first personality with a first set of host attributes expected by a first set of exploits presented by the first network connection as part of the first set of malicious attacks or the second personality with a second set of host attributes expected by a second set of exploits presented by the second network connection as part of the second set of malicious attacks;

if the first personality or the second personality cannot be generated from the one or more existing profiles, traverse one or more services expected by the first network connection or the second network connection, augment the one or more services with configuration metadata that indicates how each service of the one or more services should be configured for the first personality or the second personality, select a first set of expected attributes expected by the first set of exploits presented by the first network connection or a second set of expected attributes expected by the second set of exploits presented by the second network connection, and generate a first alternate personality for the first network connection based on the first set of expected attributes or a second alternate personality for the second network connection based on the second set of expected attributes; and present the first personality or the first alternate personality to the first network connection and the second personality or the second alternate personality to the second network connection to ensure continuity of the interactive session with the honeypot.

16. The system of claim 15, further comprising:

updating the personality state table with one or more new source IP addresses of the plurality of network connections and one or more new exploits presented by the plurality of network connections.

17. The system of claim 16, further comprising:

accessing a security exploits database;

identifying a plurality of expected attributes associated with a plurality of known exploits;

accessing a malicious attacks database;

identifying a plurality of existing source IP addresses associated with the plurality of known exploits;

correlating the plurality of existing source IP addresses with the plurality of known exploits;

generating one or more new profiles, based on the correlation;

generating the personality state table; and storing the personality state table on the honeypot.

18. The system of claim 17, further comprising:

if the first personality does not exist in the personality state table, generating the first alternate personality for the first network connection based on the first set of expected attributes of the plurality of expected attributes that are identified, by a first profile of the one or more profiles, as being similar to the first set of host attributes expected by the first set of exploits, by virtue of the correlation maintained by the personality state table between a first set of known exploits of the plurality of known exploits and a first existing source IP address of the plurality of existing source IP addresses; and if the second personality does not exist in the personality state table, generating the second alternate personality for the second network connection based on the second set of expected attributes of the plurality of expected attributes that are identified, by a second profile of the one or more profiles, as being similar to the second set of host attributes expected by the second set of exploits, by virtue of the correlation maintained by the personality state table between a second set of known exploits of the plurality of known exploits and a second existing source IP address of the plurality of existing source IP addresses.

19. The system of claim 18, further comprising:

presenting, simultaneously, the first alternate personality to the first network connection and the second alternate personality to the second network connection, if the first personality and the second personality do not exist in the personality state table.

20. The system of claim 19, wherein the first personality comprises a first state of a first protected host that is targeted by the first set of malicious attacks at a first point in time prior to, during, or after one or more previous malicious attacks from the first source IP address, as part of generating the first alternate personality, the first profile is correlated to the first state of the first protected host at the first point in time to determine similarity between the first set of expected attributes and the first set of host attributes expected by the first set of exploits and presented by the first network connection as part of the first set of malicious attacks, the second personality comprises a second state of a second protected host that is targeted by the second set of malicious attacks at a second point in time prior to, during, or after one or more previous malicious attacks from the second source IP address, and as part of generating the second alternate personality the second profile is correlated to the second state of the second protected host at the second point in time to determine similarity between the second set of expected attributes and the second set of host attributes expected by the second set of exploits and presented by the second network connection as part of the second set of malicious attacks.

\* \* \* \* \*